United States Patent [19]

Thayer

[11] Patent Number: 5,297,275
[45] Date of Patent: Mar. 22, 1994

[54] PERSONAL COMPUTER SYSTEM VARIABLE RESOLUTION TIMERS

[75] Inventor: Paul Thayer, Deerfield Beach, Fla.

[73] Assignee: International Business Machines Corporation, Armonk, N.Y.

[21] Appl. No.: 811,397

[22] Filed: Dec. 20, 1991

[51] Int. Cl.⁵ .............................................. G06F 13/00
[52] U.S. Cl. ...................................................... 395/550
[58] Field of Search .................... 395/550, 275; 364/271.5, 270.2, 270.4

[56] References Cited

U.S. PATENT DOCUMENTS

| | | | |
|---|---|---|---|
| 4,159,516 | 6/1979 | Henrion et al. | 395/275 |
| 4,611,279 | 9/1986 | Andresen et al. | 364/200 |
| 4,685,678 | 8/1987 | Frederiksen | 273/148 |
| 4,698,748 | 10/1987 | Juzswik et al. | 364/200 |
| 4,794,386 | 12/1988 | Bedrij et al. | 340/724 |
| 5,012,435 | 4/1991 | Bailey et al. | 364/569 |
| 5,117,387 | 5/1992 | Nemirovsky et al. | 395/375 |

*Primary Examiner*—Dale M. Shaw
*Assistant Examiner*—D. Dinh
*Attorney, Agent, or Firm*—Bernard D. Bogdon

[57] ABSTRACT

When using a periodically interrupting timing device to implement software timers, a wide variety of resolutions for such timers can be provided with minimal interrupt overhead. This is achieved by dynamically reprogramming the frequency of the interrupting device to be at a selected low rate necessary to provide the resolution requested by the next, impending timer to expire. This is particularly useful when a periodic timing device is the only device available to implement variable timer resolutions.

6 Claims, 7 Drawing Sheets

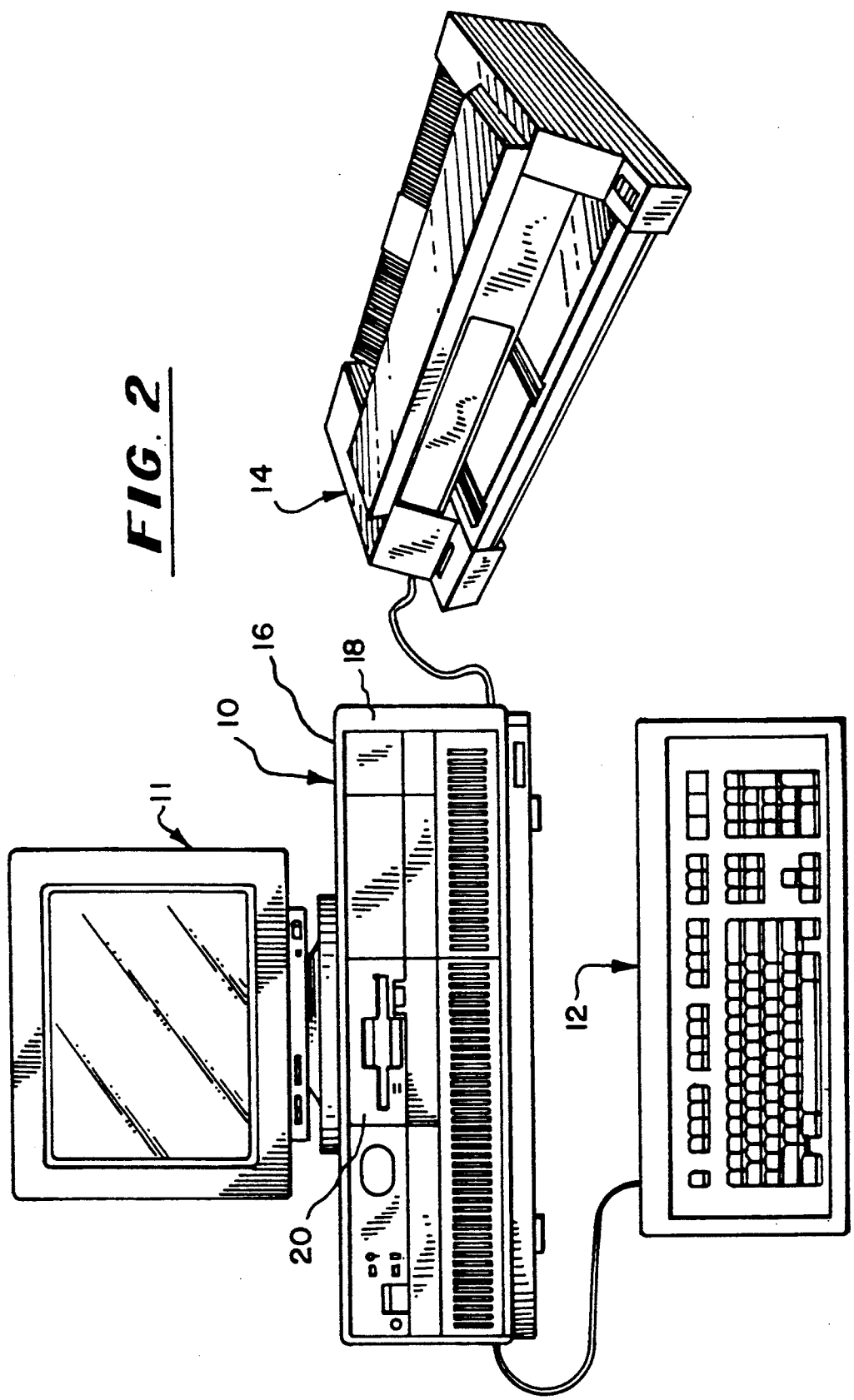

PERSONAL COMPUTER SYSTEM VARIABLE RESOLUTION TIMERS

BACKGROUND OF THE INVENTION

1. Field of the Invention

This invention relates to a personal computer with an efficient and low-overhead method for achieving a variable resolution of timer accuracy from a periodic timing device for improved computer function and particularly for computer animation sequences.

2. Description of the Related Art

Computer operating systems typically provide a mechanism which allows software to schedule an event to occur at some future time. Just as an alarm clock may be set to ring some minutes in the future, software may set a timer to expire some time in the future. Reference is made herein to a timer as a mechanism which, given a duration, a resolution, and an action, will delay for the specified duration, and after that duration, but before the latest permissible expiration time (duration plus resolution), will initiate an appropriate response for the specified action to be taken. FIG. 1 illustrates the points in time and durations of time which are relevant in the function of a software timer.

In FIG. 1, point-in-time 1 is the time at which a timer is created. A timer is created by the operating system of the computer. The program request to create the timer is accompanied by three parameters of information: (a) the duration of the timer (in some unit of time); (b) the resolution of the timer (in some unit of time); and (c) the action to be initiated by the operating system after the timer duration has passed. Point-in-time 2 is the time at which the timer has expired. The timer action is to be initiated on or after this time 2. Point-in-time 3 is the time by which the timer action must be initiated. The timer action must be initiated on or before this point-in-time 3. The time interval 4 between the point-in-time 1 when the timer is first created by the operating system and the point-in-time 2 when the timer has expired is referred to as the duration of the timer. The time interval 5 between the point-in-time 2 when the timer has expired and the point-in-time 3 when the timer action must be initiated is referred to as the resolution of the timer.

For example, a program may wish to ring a bell for 500 milliseconds (ms) or half a second. This can be achieved by turning the bell on, then starting a timer that will expire in 500 milliseconds. The action taken when the timer expires is to turn off the bell. The result is a bell ringing for half a second.

The resolution, accuracy, or permissible error in the duration of the timer may vary with the task being performed. In the case of ringing a bell, it may not matter whether the bell is turned off in 500 ms or 600 ms, as long as an acoustical sound is made. If the resolution of the timer in the before mentioned example was 100 ms, then it would be permissible for the bell to be turned off anywhere from 500 ms to 600 ms after it was turned on. If the resolution of the timer, in the before mentioned example, was 200 ms, then it would be permissible for the bell to be turned off anywhere from 500 ms to 700 ms after it was turned on.

Often a higher degree of timer accuracy is desired. One example is for that of a computer animation sequence. The animation may be playing at 50 frames per second in order that the viewer perceive a smooth flowing motion. A timer may be set up to expire 50 times per second, that is every 20 ms. When the timer expires, the action is to display the next frame. If the resolution of this timer was 100 ms as in the first bell example, the timer might expire anywhere from 20 ms to 120 ms. With this resolution, the viewer can easily detect a very undesirable, irregular, jerky motion in the animation. A timer resolution of 5 ms may be more appropriate for this circumstance and application. From the above examples, it should be clear that a need for different levels of precision in timer duration is necessary.

There are a variety of methods that might be used on a computer system to implement software timers as described above. One such method is that implemented by the IBM Advanced Interactive Executive (AIX) 3.1 Operating System. The AIX hardware platform contains a hardware device that may be programmed to generate an interrupt at a precise time in the future. The hardware device is programmed to interrupt when the next timer is due to expire. It can be precisely programmed to interrupt at the desired timer expiration time. This hardware device is reprogrammed to the time of the next timer request at each interrupt. This insures that the number of interrupts is less than or equal to the number of timer requests. The capability of this device enables AIX to provide all timers with a very good resolution.

However, in the case of the IBM Operating System 2 (OS/2) operating system, a hardware device which can be precisely programmed to interrupt at a specific time cannot be used. This device cannot be used because its function has already been claimed for use by other operating system functions. These other functions include IBM Disk Operating System (DOS) compatibility, performance monitoring and system trace facilities. There is another device that can be utilized. This specific device is not programmable to interrupt at a precise time in the future. Rather, it is programmable to interrupt at one constant periodic rate. Further, there is a limited number of periodic rates to which this device can be programmed to interrupt.

Therefore, there is a constraint that only a periodically interrupting device is available to provide the function of software timers. Further, there is a constraint that the number of interrupts required to implement software timers be kept to a minimum. It is desirable to keep the number of interrupts at a minimum to reduce operating system overhead.

One might consider that a computer system should anticipate the highest resolution that is necessary, and provide that resolution for all timers. In this manner, the system can satisfy the needs of all timers with a single, best resolution timer. This strategy would indeed work, but might be costly in terms of high system overhead time expended to service a large number of periodic interrupts.

On many computer operating systems, the resolution of the timer provided is dependent on some hardware device. In the IBM OS/2 operating system, the Motorola MC146818 device also named the Real-Time Clock Plus RAM, or its functional equivalent, is used to provide software timers. This device can be programmed to generate periodic interrupts from a limited selection of periodic rates. This device is provided in IBM Personal Computer Advanced Technology (IBM-PC AT) hardware architectures, and is also provided in all IBM Personal System 2 (PS/2) hardware architectures. It is this device that the invention method utilizes to provide variable resolution timers with minimal interrupts.

There is an inverse relationship between the frequency of the interrupts and the length of the interval between the interrupts. The resolution of the timers provided can only be as precise as the interval between interrupts. If the interrupts are occurring 10 times per second, a 100 ms resolution timer can be provided. If the interrupts are occurring 50 times per second, a 20 ms resolution can be provided. Unfortunately, as the frequency of the interrupts increases, the overhead, i.e., the time consumed by the system to service all of these interrupts increases proportionally. If the frequency of the interrupts generated by the hardware device triples, the overhead to the operating system of servicing these interrupts also triples. This presents a situation where there is a classical trade-off between improving one desirable attribute (i.e., timer resolution), but only at the sacrifice of another desirable attribute (i.e., low system overhead). A single, best resolution timer requires a constantly high periodic interrupt rate which is costly in terms of system overhead time.

Tests on an IBM PS/2 Model 80 computer indicate that an overhead of 2% of all system cpu time can be consumed by a periodic interrupt occurring at 32 times per second (Hertz or Hz). If the rate is quadrupled to 128 times per second, the overhead quadruples to 8%. Consuming 8% of all available cpu power to service periodic interrupts is very undesirable. This undesirable overhead aspect only gets worse if the interrupt rate is increased.

With this analysis, one might observe that a periodic interrupting device may not be the most appropriate device to use for implementing variable resolution timers. Indeed, as is noted above with AIX 3.1, another device can be used to implement high resolution timers within overhead constraints. However, given the constraint that this device is unavailable for use, a periodic interrupting device may be the only alternative.

SUMMARY OF INVENTION

The present invention resulted from efforts to accomplish a specific goal of increasing the accuracy of timers available on the IBM Operating System/2 ™ (OS/2 ™) computer system without violating several imposed constraints. The constraints were to: maintain upward compatibility with the current timer function on OS/2 systems; require no additional hardware other than that provided in a standard IBM-PC AT computer architecture; not increase the operating system overhead required to implement the timers; and provide a sufficiently fast and accurate timer to permit high frame rate video animation. High frame rate is considered to be 30 frames per second or greater. The solution had to easily blend into the existing OS/2 design.

Generally, operating systems program their heartbeat interrupting device at a rate which provides a constant, periodic interval at initialization time and never alter that rate. If timers are implemented via that periodic interrupt, which is a common practice, then timer resolution can never be better than that provided by the system's heartbeat timer. Some operating systems that need a higher resolution for timers utilize some other device besides the system heartbeat interrupt. However, without other suitable devices, or in the absence of other suitable devices not already in use by other system components, the present system and method provides a high resolution timer without permanently increasing the frequency of the system timer and is a high efficiency, low cost alternative. In the case of the IBM Personal Computers and so-called "clones", there are few devices available on the standard configuration which can provide such an improved timing base for timers.

The present invention provides for a high resolution of timer accuracy without changing the protocol of operation and without incurring the high cost of servicing huge numbers of periodic interrupts, by using a periodic interrupting device as a time base. This design dynamically reprograms the frequency of the interrupting device as needed, rather than to leave it at some constant frequency. Further, it manages the reprogramming of the device in such a manner that a minimal or near minimal number of extra, high frequency interrupts occur in order to provide the desired timer resolution.

Alternative approaches in related technology, program the interrupting device at high interrupt rates for a longer period of time than is necessary to achieve the high resolution desired. The present solution limits the number of interrupts entering the system to the minimal number possible while still providing the desired, high resolution interval. These aspects help make the present invention unique.

This invention is particularly applicable to the needs of multimedia applications and subsystems. Multimedia applications demand higher resolution timers than are provided presently in OS/2. Frame animation, audio/video streaming and synchronization can all benefit by having variable resolution timers available. Any class of applications which might have some real-time performance requirements has a use for variable resolution timers. A larger number and class of these applications may be run on a given hardware environment because the overhead consumed by these timers is held to a minimum.

One critical value of this design is that it uses a device which is generally found on all IBM Personal Computer Advanced Technology and PS/2 architectures. This device is the Motorola MC 146818 Real-Time Clock plus RAM (RTC) device. This device, or its functional equivalent, is a standard part of the IBM Personal Computer Architecture, from the introduction of the IBM-PC AT and continuing into the IBM PS/2 line of systems. The present innnovative method is also applicable to non-IBM Personal Computer hardware, as it can be implemented on any computer which provides a periodic interrupting device. This innovative design provides a general-purpose solution to the stated problem.

DESCRIPTION OF THE DRAWINGS

FIG. 2 is a perspective view of a personal computer system embodying this invention.

DETAILED DESCRIPTION OF INVENTION

Figure 1:
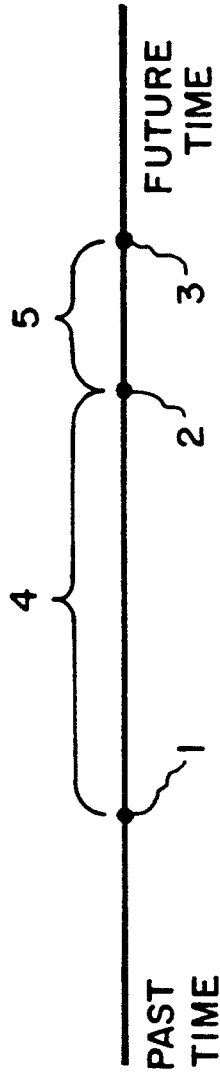
FIG. 1 is an exemplary time line graphically depicting points in time and time durations of computer timer operation.

The present inventive solution is implemented by the interrupt frequency of the device being reprogrammed dynamically as required rather than programming the hardware device to interrupt only at some constant or fixed internal. This is accomplished by maintaining a high interrupt rate for only as long as is required to provide the desired resolution for the next timer to expire, and otherwise maintaining the lowest interrupt rate setting needed by the system.

The device is a part of the personal system computer as exemplified by FIG. 2. Referring more particularly to the accompanying drawing of FIG. 2, a microcomputer embodying the present invention is there shown and generally indicated at 10. The computer 10 may have an associated monitor 11, keyboard 12 and printer or plotter 14. The computer 10 has a cover formed by a decorative outer member 16 and an inner shield member which cooperate with a chassis in defining an enclosed, shielded volume for receiving electrically powered data processing and storage components for processing and storing digital data. At least certain of these components are mounted on a multilayer planar or motherboard which is mounted on the chassis and provides a means for electrically interconnecting the components of the computer 10 including those identified above and such other associated elements as floppy disk drives, various forms of direct access storage devices, accessory cards or boards, and the like. As pointed out more fully hereinafter, provisions are made in the planar for the passage of input/output signals to and from the operating components of the microcomputer.

The front panel 18 defines at least one open bay for receiving a data storage device such as a disk drive for magnetic or optical disks, a tape backup drive, or the like. One floppy disk drive is indicated at 20 in FIG. 2, and is a removable media direct access storage device capable of receiving a diskette inserted thereinto and using the diskette to receive, store and deliver data as is generally known.

Figure 3:
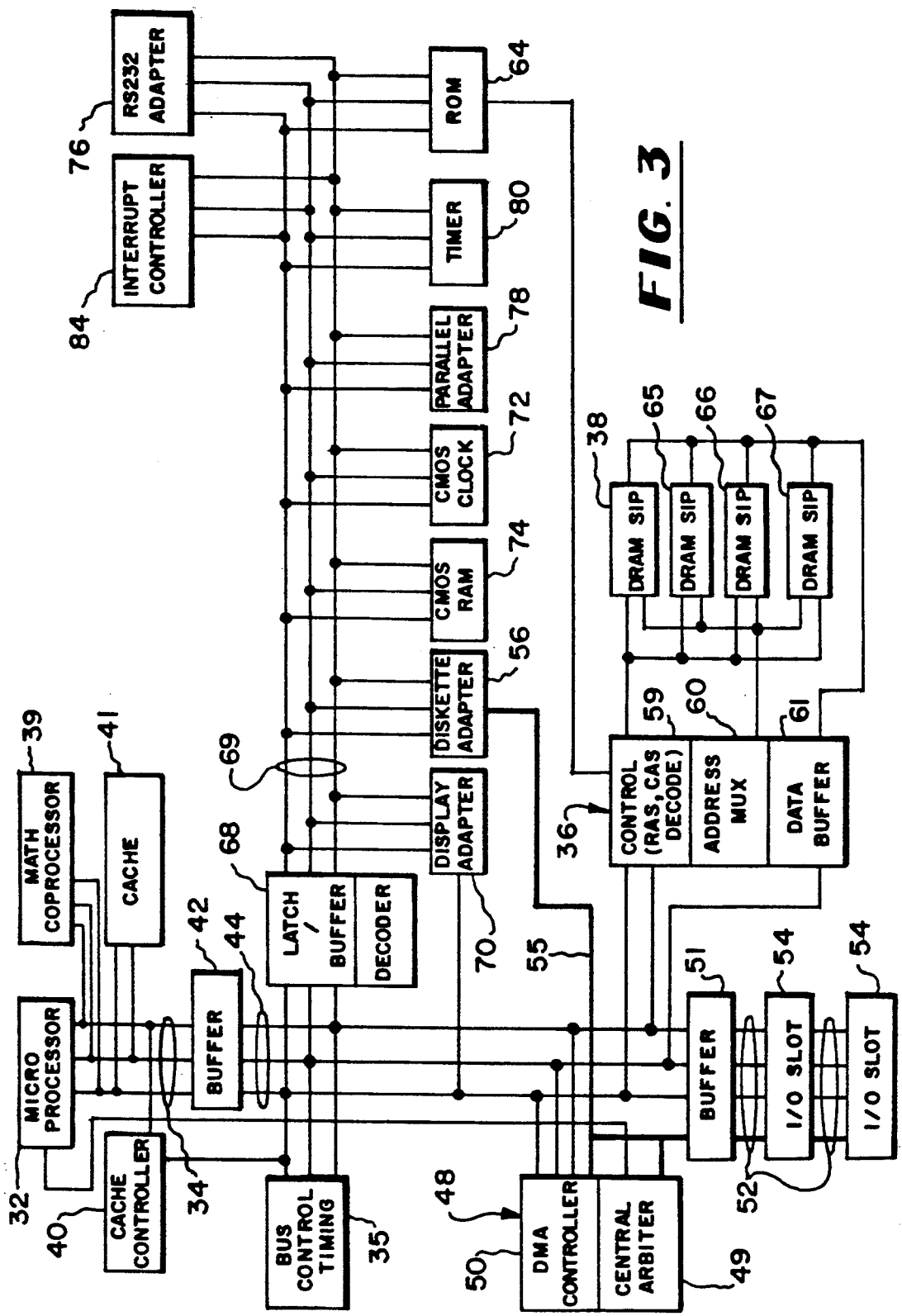
FIG. 3 is a block diagram of an exemplary personal computer system embodying the present invention.

Prior to relating the above structure to the present invention, a summary of the operation in general of the personal computer system 10 may merit review (review the following regarding FIG. 3 and where appropriate incorporate text or delete material to enhance the explanation of the invention). Referring to FIG. 3, there is shown a block diagram of a personal computer system illustrating the various components of the computer system such as the system 10 in accordance with the present invention, including components mounted on the planar and the connection of the planar to the I/O slots and other hardware of the personal computer system. Connected to the planar is the system processor 32 comprised of a microprocessor which is connected by a high speed CPU local bus 34 through a bus control timing unit 35 to a memory control unit 36 which is further connected to a volatile random access memory (RAM) 38. While any appropriate microprocessor can be used, one suitable microprocessor is the 80386 which is sold by INTEL Corporation.

While the present invention is described hereinafter with particular reference to the system block diagram of FIG. 3, it is to be understood at the outset of the description which follows that it is contemplated that the apparatus and methods in accordance with the present invention may be used with other hardware configurations of the planar board. For example, the system processor could be an Intel 80286 or 80486 microprocessor.

Returning now to FIG. 3, the CPU local bus 34 (comprising data, address and control components) provides for the connection of the microprocessor 32, a math coprocessor 39, a cache controller 40, and a cache memory 41. Also coupled on the CPU local bus 34 is a buffer 42. The buffer 42 is itself connected to a slower speed (compared to the CPU local bus) system bus 44, also comprising address, data and control components. The system bus 44 extends between the buffer 42 and a further buffer 68. The system bus 44 is further connected to a bus control and timing unit 35 and a Direct Memory Access (DMA) unit 48. The DMA unit 48 is comprised of a central arbitration unit 49 and DMA controller 50. A buffer 51 provides an interface between the system bus 44 and an optional feature bus such as the MICRO CHANNEL TM bus 52. Connected to the bus 52 are a plurality of I/O slots 54 for receiving MICRO CHANNEL adapter cards which may be further connected to an I/O device or memory.

An arbitration control bus 55 couples the DMA controller 50 and central arbitration unit 49 to the I/O slots 54 and a diskette adapter 56. Also connected to the system bus 44 is a memory control unit 36 which is comprised of a memory controller 59, an address multiplexor 60, and a data buffer 61. The memory control unit 36 is further connected to a random access memory as represented by the RAM module 38. The memory controller 36 includes the logic for mapping addresses to and from the microprocessor 32 to particular areas of RAM 38. This logic is used to reclaim RAM previously occupied by BIOS. Further generated by memory controller 36 is a ROM select signal (ROMSEL), that is used to enable or disable ROM 64.

While the microcomputer system 10 is shown with a basic 1 megabyte RAM module, it is understood that additional memory can be interconnected as represented in FIG. 3 by the optional memory modules 65, 66 and 67. For purposes of illustration only, the present invention is described with reference to the basic one megabyte memory module 38.

A latch buffer 68 is coupled between the system bus 44 and a planar I/O bus 69. The planar I/O bus 69 includes address, data, and control components respectively. Coupled along the planar I/O bus 69 are a variety of I/O adapters and other components such as the display adapter 70 (which is used to drive the monitor 11), a CMOS clock 72, nonvolatile CMOS RAM 74 hereinafter referred to as NVRAM, a RS232 adapter 76, a parallel adapter 78, a plurality of timers 80 (e.g., Intel Corporation's 8253, 8254 or 82C54 Programmable Interval Timer or equivalents), a diskette adapter 56, an interrupt controller 84, and a read only memory 64. The read only memory 64 includes the BIOS that is used to interface between the I/O devices and the operating system of the microprocessor 32. BIOS stored in ROM 64 can be copied into RAM 38 to decrease the execution time of BIOS. ROM 64 is further responsive (via ROMSEL signal) to memory controller 36. If ROM 64 is enabled by memory controller 36, BIOS is executed out of ROM. If ROM 64 is disabled by memory controller 36, ROM is not responsive to address enquiries from the microprocessor 32 (i.e., BIOS is executed out of RAM).

The clock 72 is used for time of day calculations. This clock device 72 also provides a source of programmable periodic interrupts. It is this device which is used to implement variable resolution timers as described in this invention. The NVRAM 74 is used to store system configuration data. That is, the NVRAM will contain values which describe the present configuration of the system. For example, NVRAM 74 contains information describing the capacity of a fixed disk or diskette, the type of display, the amount of memory, time, date, etc. Of particular importance NVRAM 74 will contain data (can be one bit) which is used by memory controller 36 to determine whether BIOS is run out of ROM or RAM and whether to reclaim RAM intended to be used by BIOS RAM. Furthermore, these data are stored in NVRAM 74 whenever a special configuration program, such as SET Configuration, is executed. The purpose of the SET Configuration program is to store values characterizing the configuration of the system to NVRAM 74.

With the present inventive method functioning within the before mentioned exemplary environment, the periodic interrupting device usually is operating at a fairly low frequency or overhead rate to provide for basic background operating system functions. The periodic interrupting device used by IBM Disk Operating System (DOS) is the Intel 8253 Programmable Interval Timer or its functional equivalent. IBM DOS software programs the Intel 8253 to interrupt at a constant rate of approximately 18.2 interrupts per second. IBM OS/2 uses the before mentioned Motorola MC14681 device to interrupt at a constant rate of approximately 32 interrupts per second. With this method, the operating system will alter the interrupt rate of the periodic interrupting device.

The entire timer process and the invention method is best described as a series of steps. The following sequence discussion demonstrates, with an example, how an operating system provides a timer service first without, and then with the present inventive method. It is shown that the invention method provides a higher resolution timer. Assume an application program requires that some event be initiated one third of one second (333 ms) in the future. Due to strict timing requirements, the event must be initiated between 333 ms and 343 ms from the current time. To this end, the application program requests that the operating system create a timer on its behalf with a duration of 333 ms and a resolution of 10 ms. The desired action is also specified.

Without the implementation of the present invention the sequence of events is as follows. Assume, for this example, that the periodic interrupting device is interrupting at a constant interrupt rate of 20 times per second. This means that 50 ms of time passes with each interrupt. As time passes, interrupts enter the system. When interrupts enter the system, the operating system increments its own internal system time in discrete increments equal to the interrupt period. In this example, 50 ms is added to the internal system time each interrupt. The operating system is aware that time passes only when the periodic timer interrupt enters the system. The following Table I lists the timing sequences.

TABLE I

| Time (ms) | Interrupt Number | Event |
|---|---|---|
| 0000 | 1 | Timer is Created, expires in 333 ms |
| 0050 | 2 | Add 50 ms |
| 0100 | 3 | Add 50 ms |
| 0150 | 4 | Add 50 ms |
| 0200 | 5 | Add 50 ms |
| 0250 | 6 | Add 50 ms |

TABLE I-continued

| Time (ms) | Interrupt Number | Event |
|---|---|---|
| 0300 | 7 | Add 50 ms; Expiration time in 33 ms |
| 0350 | 8 | Add 50 ms; Expiration time passed by 17 ms |

It can be seen at interrupt Number 7 of Table I that it is not yet time to initiate the timer action. To do so at interrupt 7 would cause the action to be initiated prematurely. It can also be seen that at interrupt Number 8 the time is 350 ms, that is 17 ms beyond the desired action initiation time. Since the desired resolution is 10 ms, the action must be initiated between 333 ms and 343 ms. The timing requirements cannot best be met without the inventive method.

With the implementation of the present invention, the sequence of events is as follows. Initially, the periodic interrupting device is interrupting at a constant interrupt rate of 20 times per second as before where the inventive method is not implemented. With the inventive method however, the periodic interrupt rate can be dynamically increased and decreased. As before, the operating system is aware that time passes only when the periodic timer interrupt enters the system. The following Table II lists the applicable timing sequence for this example.

TABLE II

| Time (ms) | Interrupt Number | Event |
|---|---|---|
| 0000 | 1 | Timer is Created, expires in 333 ms |
| 0050 | 2 | Add 50 ms |
| 0100 | 3 | Add 50 ms |
| 0150 | 4 | Add 50 ms |
| 0200 | 5 | Add 50 ms |
| 0250 | 6 | Add 50 ms |
| 0300 | 7 | Add 50 ms; Expiration time in 33 ms Operating system detects timer is to expire in less than 50 ms. Periodic frequency is reprogrammed from 20 to 100 interrupts per second; from a 50 ms period to a 10 ms period. |
| 0310 | 8 | Add 10 ms; Expiration time in 23 ms |
| 0320 | 9 | Add 10 ms; Expiration time in 13 ms |
| 0330 | 10 | Add 10 ms; Expiration time in 3 ms |
| 0340 | 11 | Add 10 ms; Expiration passed by 7 ms but time is still within desired resolution of 10 ms. Initiate the time action, then reprogram the periodic frequency back to 20 Hz. |
| 0390 | 12 | Add 50 ms |

It can be seen that at interrupt Number 7 it is not yet time to initiate the timer action. Yet at this time the operating system can detect that a timer with a 10 ms resolution is due to expire in less than 50 ms in the future. At this point, the operating system reprograms the periodically interrupting timer device to a higher interrupt rate, in this case 100 Hz. This results in an interrupt period of 10 ms. For the next 4 interrupts, the operating system advances the system time in increments of 10 ms until the system time is 340 ms.

At this point, 340 ms has transpired since the timer was first created. The operating system detects that the timer action should be initiated as the timer expiration time has passed. However, unlike the non-inventive example, the timer action is initiated within the required 10 ms resolution. The operating system reduces the interrupt rate back to the slower 20 Hz rate.

An alternative, but less desirable, method which satisfies the 10 ms resolution requirement would be to simply program the periodic interrupting device to interrupt at a constant 100 Hz at the time the timer was created. But this method causes 34 interrupts to enter the system before the timer is expired. The inventive method achieves the same accuracy with only 11 interrupts, resulting in a greatly reduced overhead.

Both Table 1 and Table 2 indicate that the timer was created at the moment of interrupt Number 1. In practice, timers are created asynchronously to the arrival of periodic interrupts and can be created at any time. The examples used in Table 1 and Table 2 are meant to compare actions that are taken when a timer expires, not when a timer is created. For simplifying the example, the timers were created at the time of interrupt Number 1.

For another detailed working example assume a periodic interrupting device that can be programmed to interrupt at a frequency that is some power of 2. That is, it can interrupt at 2 Hz, 4 Hz, 8 Hz, 16 Hz, 32 Hz, 64 Hz, 128 Hz, 256 Hz, 512 Hz and so on. Such a device is found on all IBM Personal Computer Advanced Technology computers, IBM PS/2 computers and compatibles. Assume that at a minimum, the operating system requires interrupts at 32 Hz. This is the rate currently used by all releases of OS/2 software. This provides a 31.25 ms interval, thus the timer resolution is 31.25 ms. As long as all software on the system can perform its function within a 31.25 ms timer resolution, the interrupting device will remain at 32 Hz.

Now consider the case of a one-shot timer. A one-shot timer is a timer that expires just once, such as was the case with the timer that caused the before mentioned bell to ring for 500 ms. Assume this one-shot timer must expire within a certain accuracy and a program needs to have some event occur in 30 seconds, but requires a resolution of 8 ms. That is, the timer should expire anywhere from 30,000 ms to 30,008 ms in the future. While waiting for the time to expire, the interrupting device is kept at the slower 32 Hz rate. When the system time advances to within a very short time before the expiration time, it detects that a 8 ms resolution timer is scheduled to expire within just one 31.25 ms time interval. It should be noted that some lead time is needed in order to reprogram the interrupting device. This lead time is typically the duration of one timer interval. In the present example, that is 31.25 ms. At this time, the interrupting frequency is increased to 128 Hz, thus permitting a 7.8125 ms timer resolution. The timer is expired and the interrupt rate is set back to 32 Hz.

With this method, at most only two extra interrupts occur instead of many thousands. To be more precise, a delay of 30 seconds with an interrupt rate of 128 Hz causes (30×128) or 3,840 interrupts to occur. With the present solution, the interrupt rate is kept at the slower rate of 32 Hz which causes (30×32) or 960 interrupts to occur. The interrupting device is briefly programmed to 128 Hz which causes up to 3 interrupts to occur before expiring the timer. Thus a total of 963 interrupts occur. In analysis, 3,840 interrupts (constant interrupt rate method) minus 963 (variable interrupt rate method) or 2877 fewer interrupts occur. So in this particular example, when compared to the constant interrupt rate method, a total of 2,877 interrupts are eliminated or saved. As the number of timers and the desired resolution is increased, an even more substantial savings in operating system overhead is realized by using the proposed method instead of the constant interrupt rate method.

As a further example, consider the case where the user wishes to play a short segment of animation at 50 frames per second. This requires an interval of 20 ms. The present solution will reprogram the interrupting device to a higher frequency, say 128 Hz, and run the short animation while providing better than 8 ms resolution. At the end of the animation segment, the interrupting device will be returned to 32 Hz. Thus the high interrupt rate is sustained only for the period necessary.

Figure 4:
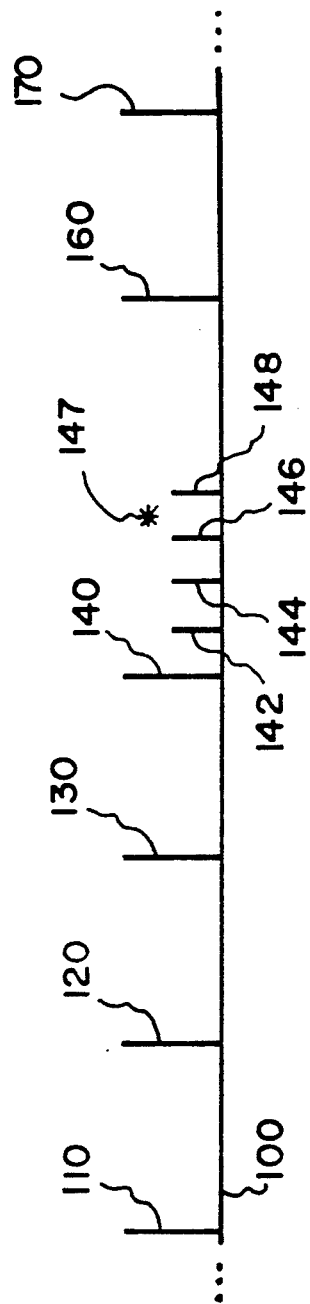
FIG. 4 is a time line graphically depicting the variable resolution inventive features of the present invention.

To better visualize how this method is implemented, consider the time-line of FIG. 4. In FIG. 4, there is depicted a continuous time line 100, where time advances from left to right on the line 100. The vertical lines 110, 120, 130, 140, 142, 144, 146, 148, 160, and 170 depict the arrival time points of periodic interrupts into the operating system. These are the time-points of interrupts generated by the periodic interrupting device. Several time points of interest are depicted with labels. The asterix 147 immediately above the time line 100, following time point 146 but before time point 148, represents a time point for a timer that is to expire at that particular point-in-time. From periodic interrupts 110 to 140, interrupts are arriving at some constant relatively low frequency rate. During these low-frequency interrupts, the operating system is aware that the time point 147 is still well in the future.

However, at time point 140, the operating system detects that the time point 147 timer is to expire before the next low-frequency tick will come into the system. One method by which the operating system can determine at which time the next timer is due to expire is hereinafter described. Each timer in the list of timers in the system indicates the time at which it is intended to expire. It is further assumed that the operating system itself knows the real time of day accurate to within one periodic timer interval.

The DOS and OS/2 operating systems know what the time of day is to an accuracy of the discrete resolution of the periodic interrupting device. The operating system can determine this time by reading the independent time-keeping device which is present on all IBM Personal Computer AT architectures. Alternately, the operating system can determine the time of day by accurately initializing this time at startup time, and constantly updating this time by counting periodic interrupts of constant, known as periods.

The operating system compares the current operating system time with the time each timer is intended to expire. By such a comparison, the operating system can determine how much more time must transpire before the timer will expire. By keeping the list of timers sorted, in order of next timer to expire, to last timer to expire, the operating system can quickly detect which timer is the next to expire, and how much time is left before it will expire.

At time point 140 the operating system implementing the timer scenario depicted in FIG. 4 increases the frequency at which the periodic interrupts come into the system. Within just a few high-frequency interrupts, time will have arrived at the time point 146. One interrupt later, at time point 148, the operating system detects that the given time point 147 has arrived or passed by no more than the interval of one high-frequency interrupt.

By delaying the increase in interrupt frequency as long as possible, and by limiting the time that the interrupt device is at the faster rate to only a few interrupts, the system enjoys minimal interrupt overhead while being able to provide high resolution timers.

The following proof substantiates that the invention method uses "minimal" interrupts in accordance with the adopted objectives of the present invention. Consider a periodic interrupting device which can be programmed to interrupt at one of "n" different distinct intervals. Let I1, I2, I3, ... In be the n different intervals at which the device can be programmed, where (a) I1 is the smallest possible interval, (b) In is the largest possible interval, and (c) I1<I2<I3<... <In. Let Ic be the interval at which the device is currently programmed to interrupt, where the subscript c takes any integer value from 1 to n. The system keeps time by receiving interrupts and adding the interval of that interrupt to an accumulated system time value designated Ts.

It is clear that the system time Ts is not always equal to the real time Tr. At any instant of real time, the following relation holds:

$$Tr - Ic < Ts <= Tr.$$

That is, the system time Ts is greater than the real time Tr minus one interval Ic (the time at which Ts was last updated); and is less than or equal to Tr (the time at which Ts will next be updated). Ts equals Tr only at that instant when Ts is updated. Gradually, Ts falls behind Tr until Ts equals Tr minus Ic, at which time the interrupt enters the system and the system sets Ts to equal Tr.

The system is aware of the time Ts, not Tr. The system time Ts is most accurate when Ts equals Tr. That occurs immediately after Ts is updated while in the interrupt routine.

An alarm is incorporated in the system and is due to expire at some time in the future designated Ta. The alarm should expire when Tr is greater than or equal to Ta. Further, the alarm should expire no later than when Tr equals Ta plus Ie, where Ie is some error interval. The system cannot know when Tr equals Ta because it cannot know Tr. The system does know Ts to be as follows:

$$Tr - Ic < Ts <= Tr.$$

The objective is to accumulate time Ts with minimal interrupts but not overshoot time Ta by more than Ta plus Ie. Since I1 is the minimal value for Ic, it follows that the best accuracy of Ts is I1. Since In is the maximum value for Ic, it follows that the worst accuracy of Ts is In. For the alarm to expire with an accuracy of Ie, Ie must be greater than or equal to I1. If Ie is greater than In, the alarm will always expire with an accuracy of better than Ie. Considered here are only the following cases of interest:

$$I1 <= Ie <= In.$$

If Ic equals In, Ts will accumulate with the minimal number of interrupts, but Ts can overshoot Ta by as much as In.

At every interrupt, the system knows, Ts, Ta, I1, I2, I3, ... In, Ie and Ic. From these, the system can determine:

Ir—the interval of time remaining until the alarm can first expire: (Here, the "r" is for "remaining.")

$$Ir = Ta - Ts$$

Ire—the interval of time remaining until the alarm can last expire: (Here, the "re" is for "remaining plus error.")

$$Ire = (Ta + Ie) - Ts$$

$$Ire = Ir + Ie$$

Im—the maximum interval in the set of intervals I1, I2, I3, ... In such that when Im is added to the current system time Ts, the sum does not exceed Ta+Ie. Im is the maximum interval less than the interval remaining before the alarm must expire (Ire). (Here, the "m" is for "maximum.")

$$1 <= m <= n;$$

$$Im <= Ire <= Im+1$$

Ix—the interval in the set of intervals I1, I2, I3, ... In nearest to but less than or equal to Ie. (Here, the "x" is for "expiring.")

$$1 <= x <= n;$$

$$Ix <= Ie < Ix+1$$

The following is a constructional proof of the minimal interrupt premise.

Initially select Ic to equal Im (the maximum interval that can transpire without exceeding Ta plus Ie). Time passes in intervals of Im. By the manner in which Im is selected, it is known that time is passing with minimal interrupts. As time passes, Ts approaches Ta plus Ie, thus reducing Ir. The value of Ir (and Ire) is recomputed every interrupt. From Ire, recompute the value of Im and set Ic to equal Im. In this manner, Ic is always the interval at which time passes with the minimal number of interrupts without exceeding Ta plus Ie. As Ic is reduced, it converges to Ix. That is, the current interval Ic will become smaller until it is less than or equal to Ie, the desired error interval.

Eventually, Ic equals Ix, the greatest interval less than or equal to Ie. After Ic is reduced to Ix, one more interrupt will occur, at which time the following relationship is true: Ta<=Ts<=Ta+Ie. At this time, the alarm will be expired. Thus, the alarm is expired to an accuracy of Ie with the minimal number of interrupts.

A recap of the defined terms and values follows:

n—number of different intervals the interrupting device can be programmed to.

I1, I2, I3, ... In—intervals, durations of time, at which the device can be programmed.

Tr—real time

Ts—system time

Ta—time of alarm

Id—interval the device is programmed to interrupt at startup time. This is the "default" interval. Since the minimal number of interrupts is desirable here, default is set to In. However, a realistic scenario may have this set to some f interval less than In, since the operating system may desire a smaller interval for other, non-alarm related services.

Ie—alarm error interval, alarm should expire no more than Ie time units after Ta.

Ic—current interval the device is programmed to interrupt.

Ir—the interval of time remaining until the alarm can first expire: (Here, the "r" is for "remaining.")

$$Ir = Ta - Ts$$

Ire—the interval of time remaining until the alarm can last expire: (Here, the "re" is for "remaining plus error.")

$$Ire = (Ta + Ie) - Ts$$

Im—the maximum interval in the set of intervals I1, I2, I3, ... In such that when Im is added to the current system time Ts, the sum does not exceed Ta + Ie. Im is the maximum interval less than the interval remaining before the alarm must expire (Ire). (Here, the "m" is for "maximum.")

$$1 <= m = n;$$

$$Im <= Ire <= Im+1$$

Ix—the interval in the set of intervals I1, I2, I3, ... In nearest to but less than or equal to Ie. (Here, the "x" is for "expiring.")

$$1 <= x <= n;$$

$$Ix <= Ie < Ix+1$$

The following is a step-by-step algorithmic flow as to how the invention method can be implemented using the before set forth definitions.

The following startup algorithm is executed at system startup time. It initializes the periodic interrupting device to interrupt the system at some constant interval.

Startup Algorithm:
0: Enter;
1: Set Id=In; (initialize system to have minimal interrupts.);
2: Set Ic=Id;
3: Set Ts=O;
4: Program periodic interrupting device to interrupt at interval Ic;
5: Exit;

The following new alarm algorithm is executed by the operating system when an application sets an alarm. It inserts the new, pending alarm into a set of pending alarms stored by the operating system.

New Alarm Algorithm:
0: Enter; (Routine is entered with Ta, Ie values for this alarm);
1: Store the Ta value for this alarm in the set of pending alarms;
2: Store the Ie value for this alarm in the set of pending alarms;
3: Exit;

The following timer tick algorithm is executed every time the interrupt from the periodic interrupting timing device enters the system. The algorithm is found in the interrupt handler routine, in the device driver for the periodic interrupting device.

Figure 5:
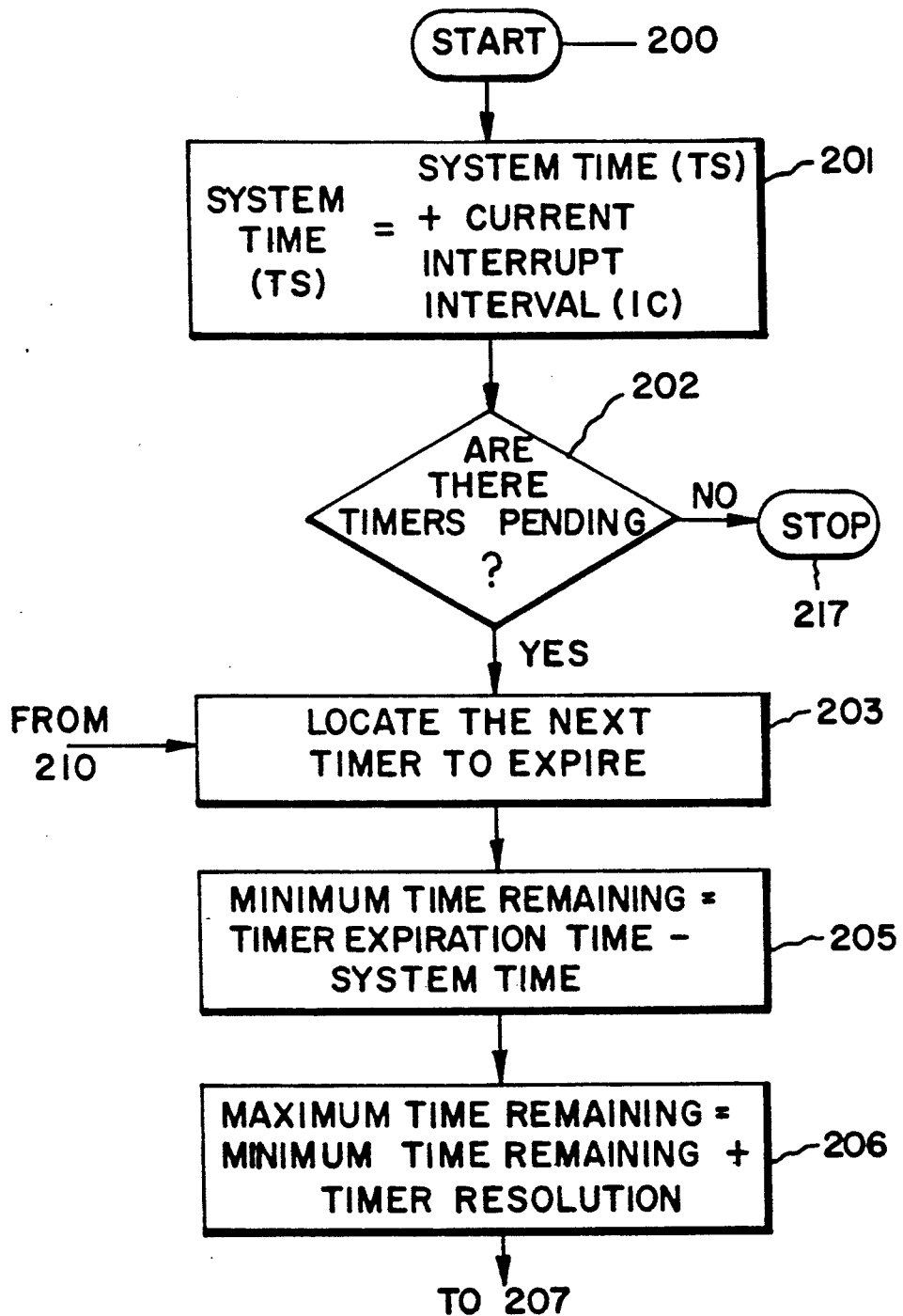
FIGS. 5, 6 and 7 comprise a flowchart for the timer tick algorithm of the present invention.
Figure 6:
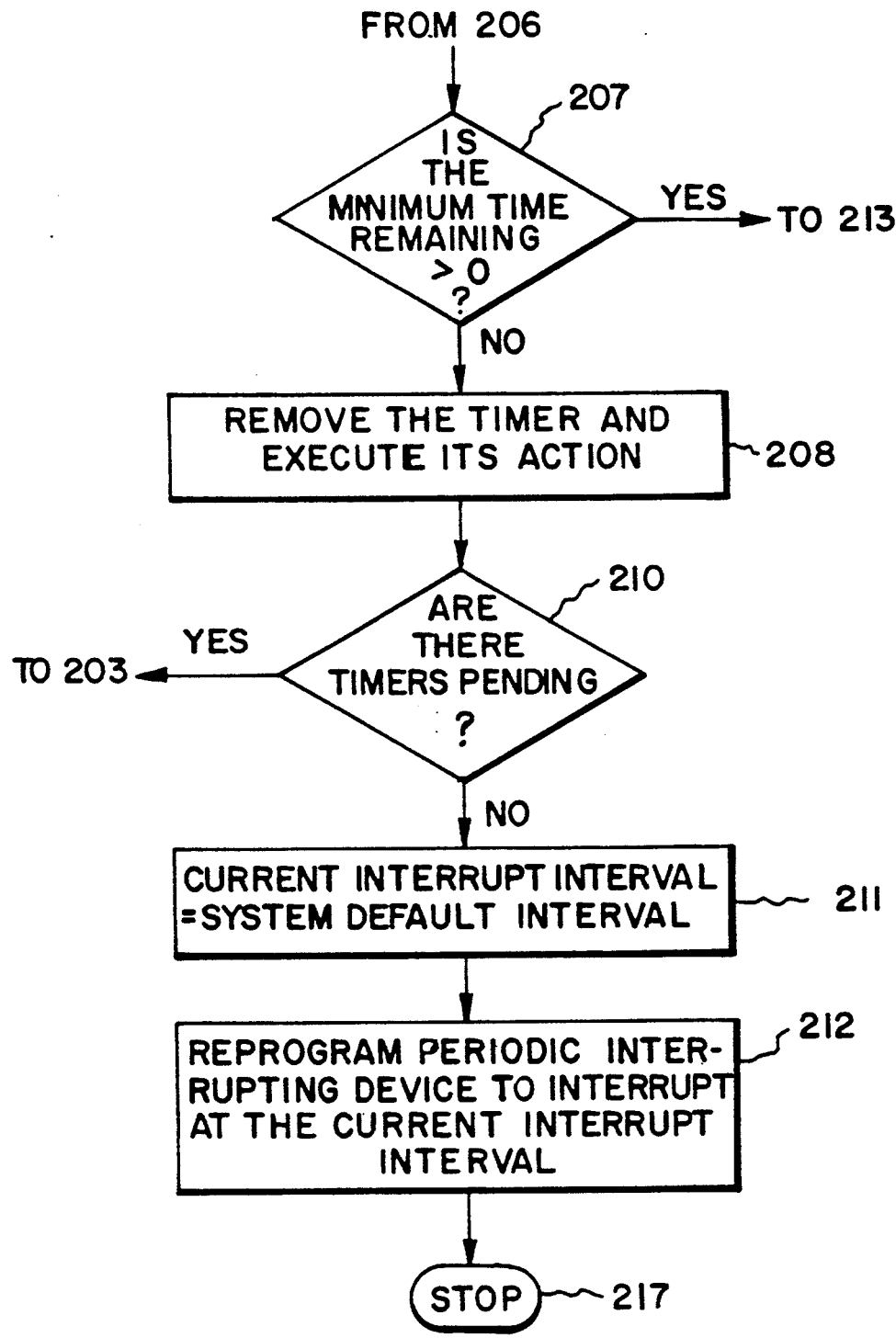
Figure 7:
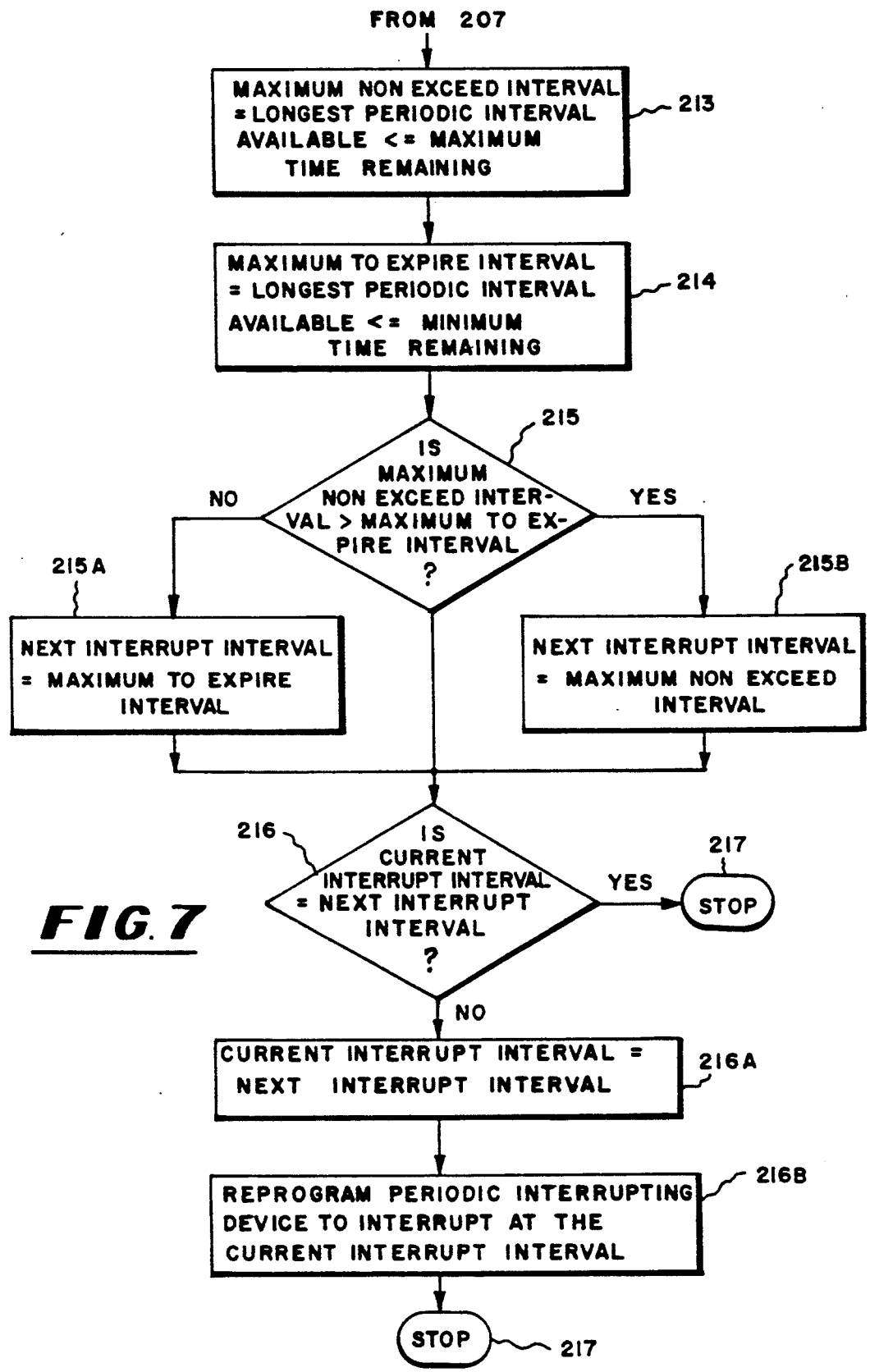

FIGS. 5, 6 and 7 illustrate, in flowchart format, the 0 through 17 steps set forth in the following timer tick algorithm (TTA).

Timer Tick Algorithm:
0: Enter
1: Set Ts=Ts+Ic; (Update system time);
2: If no alarms in the system, go to step 17 (exit);
3: Locate the next alarm in the set of pending alarms to expire. Do this by selecting the alarm with the minimal value of Ta+Ie.
4: Recover the values of Ta, Ie for the alarm located in step 3;
5: Set Ir=Ta−Ts; (Compute interval remaining before next alarm can expire at the earliest.)
6: Set Ire=Ir+Ie; (Compute interval remaining before next alarm can expire at the latest.)
7: If Ir>0 go to Step 13; (Alarm not due to expire yet.)
8: Remove alarm from set of pending alarms;
9: Expire alarm;
10: If more alarms are in the system, go to step 3;
11: Set Ic=Id; (Reset interval to system default.)
12: Go to step 17 (exit);
13: Set Im=maximum interval from I1, I2, ... In such that Im<=Ire;
14: Set Ix=maximum interval from I1, I2, ... In such that Ix<=Ie;
15: If (Im>Ix) than set Ic=Im, else set Ic=Ix;
16: If periodic interrupting device is not currently interrupting at interval Ic, then reprogram periodic interrupting device to interrupt at interval Ic;
17: Exit;

Specifically TTA steps 0, 1 and 2 correspond to the steps illustrated by blocks 200, 201 and 202 respectively of FIG. 5. Whereas TTA steps 3 and 4 are encompassed within block 203 of FIG. 5. The TTA steps 5, 6 and 7 are further illustrated respectively in the steps 205, 206 and 207 of FIGS. 5 and 6. TTA steps 8 and 9 are carried out in block 208 of FIG. 6. Subsequent TTA steps 10, 11, 12, 13 and 14 respectively correspond directly to the steps of blocks 210, 211 and 212 of FIG. 6 and to the steps of blocks 213 and 214 of FIG. 7. The TTA step 15 is described in blocks 215, 215A and 215B of FIG. 7. The process of TTA step 16, is further elaborated upon in FIG. 7 at the steps of blocks 216, 216A and 216B.

The discussion which follows covers the most frequently occurring cases of the algorithmic exercise:

Case 1: No alarms in the system.
Solution: Enter, update the system time Ts, and exit.

Case 2: One alarm in the system whose expiration time has come.
Solution: Enter, update the system time Ts, locate the alarm, determine that it is to expire, expire it, reset interrupting interval to Id, and exit.

Case 3: Several alarms in the system whose expiration time has come.
Solution: Enter, update the system time Ts, locate the next alarm to expire (the alarm with the minimal value for Ta+Ie), if Ta> =Ts then expire the alarm, [continue looping until all alarms are expired], reset interrupting interval to Id, and exit.

Case 4: One alarm in the system whose expiration time has not come.
Solution: Enter, update the system time Ts, locate the next alarm to expire (the alarm with the minimal value for Ta+Ie), note that Ta>Ts (the alarm is not ready to expire), compute Im (the maximum interval which can transpire without Ts exceeding Ta+Ie), compute Ix, set Ic=maximum of (Im, Ix), reprogram interrupting device to interrupt at interval Ic if not already doing so, exit.

There are many more plausible cases, but the above cases are the most common.

For efficiency, the pending alarms can be stored in a sorted order so that locating the next alarm to expire can be accomplished rapidly.

In summary, when the operating system detects that a timer, with a resolution more stringent than the current interrupt rate can support, is about to expire, the operating system increases the frequency of the interrupting device. The frequency is increased by reprogramming the hardware device, typically with software instructions. The Motorola MC 146818 RTC device or its functional equivalent has several discrete interrupt frequencies at which it can be programmed to run. As soon as the timer has expired, the interrupting device is reset to the lower interrupt rate, also by reprogramming the hardware device with instructions appropriate for that device. The costly, high interrupt rate is only maintained for a very short time, just long enough to provide the higher resolution required by the next timer to expire.

Care must be taken so that the operating system is always aware of the rate at which the periodically interrupting timing device is sending interrupts into the system. This is because the operating system must always add in the correct amount of time which has passed between interrupts. This is not difficult, because it is the operating system which controls the periodically interrupting device and dictates at which interrupt rate it will run. After that timer has expired, if no other higher resolution timer will imminently expire, the interrupting device can be reset to its slower, less overhead intensive interrupt rate.

It is necessary that the device is capable of being dynamically reprogrammed to different interrupting frequencies. The behavior of the interrupting device during the reprogramming operation may vary from device to device. The programmer will have to use due care to reprogram the interrupting device in a manner that is appropriate to the specific device. The interrupt rate of the device must be capable of being changed by the operating system in some manner.

Figure 8:
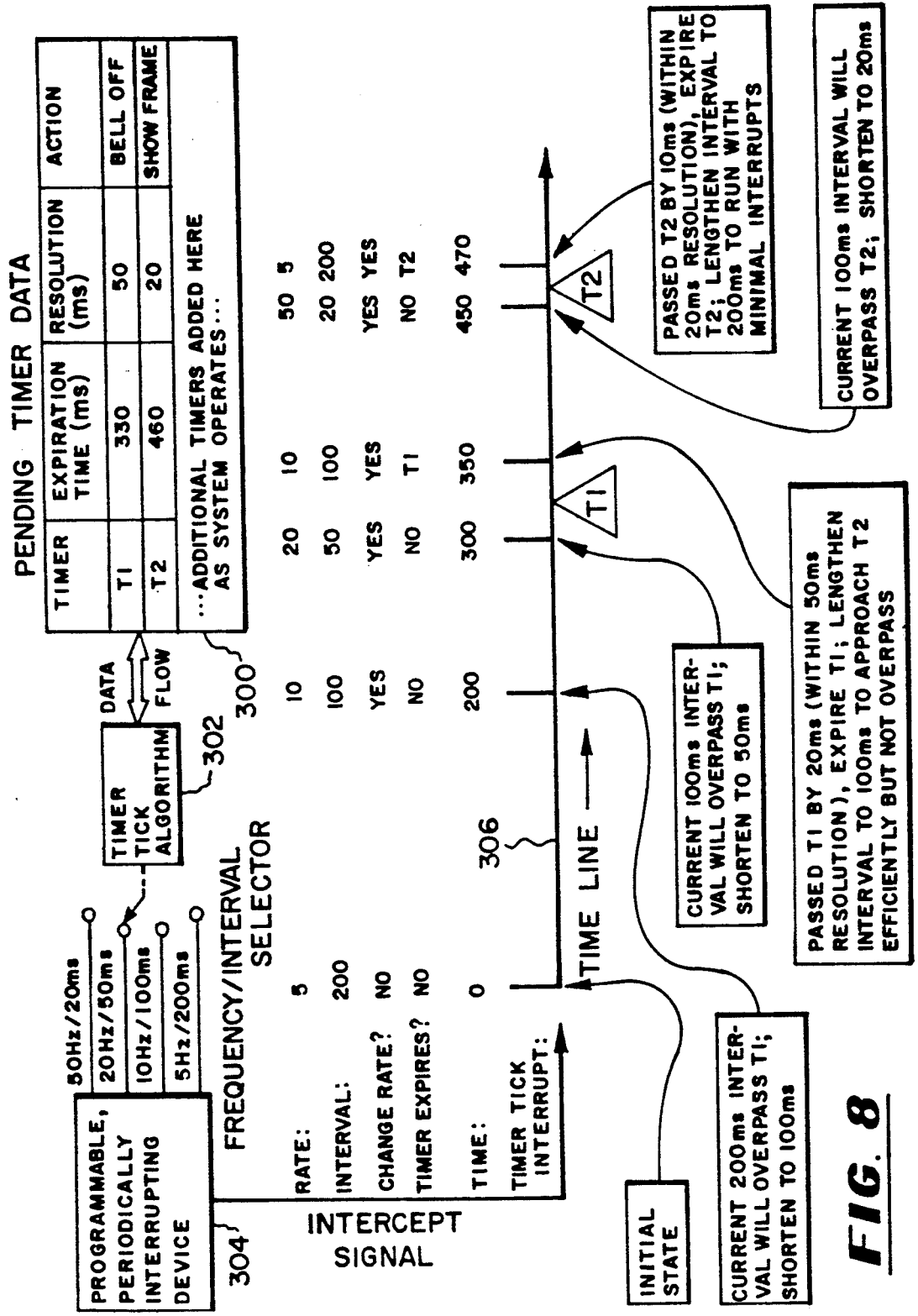
FIG. 8 comprises a system block diagram and exemplary corresponding time line of the present invention.

FIG. 8 best summarizes and illustrates the major functional elements of the invention. The pending timer data block 300 contains descriptions of two exemplary timers T1 and T2, which are used by way of illustration and comprise timers such as those identified under the Description of the Related Art. The timer tick algorithm block 302 executes after every occurrence of a timer tick interrupt and examines the pending timer data of timers T1 and T2 and their operation, as best illustrated in FIGS. 5–7 which illustrate the timer expiration detection, the step of varying the fixed frequency and the steps for generating signals and carrying out the action called for. The timer tick algorithm 302 controls the frequency/interval selector in step 212 of FIG. 6 and step 216B of FIG. 7 which can set the programmable, periodic interrupting device 304 to pulse timer tick interrupts at different rates. The periodic interrupting device 304 generates an interrupt signal, which is detected by the operating system which then executes the timer tick algorithm.

To illustrate the behavior of the timer tick algorithm 302, two examples are given. A time line 306, similar by way of example to FIG. 4, is shown (time increases from left to right), as in FIG. 4, with a series of timer tick interrupts occurring. Each timer tick is depicted by a short vertical bar attached to the time line as in FIG. 4. The expiration time for timers T1 and T2 are marked just below the time line with triangle pointers for T1 and T2. With each timer tick, the timer tick algorithm 302 takes some actions which may involve changing the timer tick interrupt rate/interval and/or expiring a timer, in this case T1 or T2. The status of these actions is shown in table form above the time line 306 for each timer tick interrupt (vertical bar) on the time line 306. For each timer tick, (vertical bar) a corresponding explanation box describes what the timer tick algorithm is doing and why as is set forth in FIGS. 5–7. In the explanation box text, "overpass" refers to time passing by a timer's expiration time by more than the timer's resolution. To "expire" a timer (e.g. T1 or T2), the timer tick algorithm 302 signals the action associated with the timer T1 or T2.

While the invention has been shown and described with reference to particular embodiments thereof, it will be understood by those skilled in the art that the foregoing and other changes and details may be made therein without departing from the spirit and scope of the invention.

What is claimed is:

1. A variable resolution timer system for a data processing system, including a processor, memory, local processor bus, buffer means for receiving signals from the processor along a local process bus and for generating output signals as a function of the received signals for processing by an input/output device, input/output bus for receiving the output signals and a planar board for supporting the data processing system components, including the local processor bus and the input/output bus comprising:

a periodic interrupting device for generating periodic interrupts within the data processing system at a fixed frequency and constant time intervals;

a timer having a duration time value constituting a length of time in some unit of time that is to be delayed, and a resolution time value constituting a length of time in some unit of time that is not to be exceeded;

first detection means for detecting if the timer expires before the next periodic interrupt;

varying means for varying the fixed frequency of the periodic interrupts generated by the periodic interrupting device upon detection by the first detection means of the timer expiring before the next periodic interrupt at the fixed frequency;

second detection means for detecting if the time expired after a periodic interrupt;

signal means for generating signals in response to the second detection means detecting the expiration of the timer to reset the periodic interrupt rate of the periodic interrupting device until such time as the first detection means detects the expiration of a timer at any subsequent given time before the next generated periodic interrupt occurring at the reset periodic interrupt rate; and action means activated by a signal from the signal means for initiating an action within the data processing system.

2. A variable resolution timer for a data processing system, including a processor, memory, local processor bus, buffer means for receiving signals from the processor along a local process bus and for generating output signals as a function of the received signals for processing by an input/output device, input/output bus for receiving the output signals and a planar board for supporting the data processing system components, including the local processor bus and the input/output bus comprising:

interrupt means for generating periodic interrupts within the data processing system at a fixed frequency and constant time intervals;

a timer having a duration time value constituting a length of time in some unit of time that is to be delayed, and a resolution time value constituting a length of time in some unit of time that is not to be exceeded;

first detection means for detecting if the timer expires before the next periodic interrupt;

varying means for varying the fixed frequency of the periodic interrupts generated by the interrupt means upon detection by the first detection means of the timer expiring before the next periodic interrupt;

second detection means for detecting if the timer expired after a periodic interrupt;

signal means for generating signals in response to the second detection means detecting the expiration of the timer to reset the periodic interrupt rate of the periodic interrupting device until such time as first detection means detects the expiration of a timer at any subsequent given tim before the next generated periodic interrupt; and action means for initiating an action within the data processing system in response to a generated signal from the signal means.

3. The variable resolution timer as defined in claim 2, wherein the varying means varies the fixed frequency of the periodic interrupts for the periodic interrupts to occur more frequently at constant and shorter time intervals than the periodic interrupts initially generated.

4. A method for providing variable resolution timing in a data processing system having executable computer code, including a processor, memory, timer system, local processor bus, buffer means for receiving signals from the processor along a local process bus and for generating output signals as a function of the received signals for processing by an input/output device, input/output bus for receiving the output signals and a planar board for supporting the data processing system components, including the local processor bus and the input/output bus, comprising the steps of:

generating periodic interrupts within the data processing system at fixed and constant time intervals;

detecting if a timer expires before the next fixed and constant time interval periodic interrupt;

varying the fixed and constant time interval of the periodic interrupts as a function of the detection of the timer expiring before the next fixed and constant time interval periodic interrupt;

detecting if the timer expired after a periodic interrupt generated at a time interval varied from the initial fixed and constant time interval;

generating signals in response to the detection of the expiration of the timer for resetting the periodic interrupts until such subsequent time as any timer is detected to expire before the next periodic interrupt; and initiating an action of the execution of some portion of the executable computer code within the data processing system as a function of the generated signals.

5. A method for providing variable resolution timing for a data processing system having executable computer code, including a processor, memory, local processor bus, buffer means for receiving signals from the processor along a local process bus and for generating output signals as a function of the received signals for processing by an input/output device, input/output bus for receiving the output signals and a planar board for supporting the data processing system components, including the local processor bus and the input/output bus, comprising the steps of:

generating periodic interrupts within the data processing system at a periodic interrupt rate occurring at constant time intervals;

detecting if a timer expires before the periodic interrupt;

varying the periodic interrupt rate of the periodic interrupts upon the detection of the timer expiring before the next periodic interrupt;

detecting if the timer expired after a periodic interrupt; and generating a signal in response to the detection of the expiration of the timer for resetting the periodic interrupt rate of a device for generating the periodic interrupts until such time as a timer is detected to expire before the next generated periodic interrupt; and initiating the execution of some portion of the executable computer code within the data processing system at a given time as a function of the generated signals.

6. The variable resolution timer system as defined in claim 1, wherein the signal means for generating signals in response to the second detection means detecting the expiration of the timer, resets the periodic interrupt rate of the periodic interrupting device to an interrupt rate to which the data processing system's operating system has been programmed to operate, and which provides a constant periodic interval at initialization of the data processing system.

* * * * *